(12) United States Patent
Abbiati

(10) Patent No.: US 11,503,956 B2
(45) Date of Patent: Nov. 22, 2022

(54) GRINDER-DOSERS

(71) Applicant: Gruppo Cimbali S.p.A., Binasco (IT)

(72) Inventor: Giacomo Abbiati, Binasco (IT)

(73) Assignee: Gruppo Cimbali S.p.A., Binasco (IT)

( * ) Notice: Subject to any disclaimer, the term of this patent is extended or adjusted under 35 U.S.C. 154(b) by 0 days.

(21) Appl. No.: 17/109,680

(22) Filed: Dec. 2, 2020

(65) Prior Publication Data

US 2021/0169274 A1 Jun. 10, 2021

(30) Foreign Application Priority Data

Dec. 6, 2019 (IT) .................. 102019000023256

(51) Int. Cl.
| | |
|---|---|
| *A47J 42/40* | (2006.01) |
| *A47J 31/40* | (2006.01) |
| *A47J 42/50* | (2006.01) |
| *A47J 42/16* | (2006.01) |
| *A47J 42/38* | (2006.01) |

(52) U.S. Cl.
CPC ..................... *A47J 42/40* (2013.01)

(58) Field of Classification Search
CPC .. A47J 42/40; A47J 42/50; A47J 42/16; A47J 42/38; A47J 31/404
See application file for complete search history.

(56) References Cited

U.S. PATENT DOCUMENTS

| | | | | |
|---|---|---|---|---|
| 4,979,650 A | * | 12/1990 | Blom ..................... | G01F 11/18 222/197 |
| 2012/0024160 A1 | * | 2/2012 | Van Os .................. | A47J 31/42 426/115 |
| 2012/0118165 A1 | * | 5/2012 | Van Os .................. | A47J 36/022 222/548 |

(Continued)

FOREIGN PATENT DOCUMENTS

| | | |
|---|---|---|
| DE | 102014107647 A1 | 12/2015 |
| EP | 3329811 A1 | 6/2018 |

OTHER PUBLICATIONS

International Search Report and Written Opinion in corresponding Italian Application No. 102019000023256 dated Jul. 22, 2020, 8 pages.

*Primary Examiner* — Adam J Eiseman
*Assistant Examiner* — Mohammed S. Alawadi
(74) *Attorney, Agent, or Firm* — MH2 Technology Law Group LLP

(57) ABSTRACT

A grinder-doser may include: grinding members configured to receive and grind coffee beans and configured to deliver ground coffee into a dispensing conduit; a compacting member including a dispensing opening aligned with the dispensing conduit; a slide guide; and a sliding block configured to slide along the slide guide for selectively superimposing a first or second opening to the dispensing opening, allowing the ground coffee to move from the dispensing conduit to the dispensing opening via the first or (Continued)

second opening. The first opening may be reversibly closed by a closure element. The closure element may include a flexible sheet. The closure element may be configured to allow the ground coffee to move from the dispensing conduit to the dispensing opening as a thrust limit value exerted by the ground coffee on the closure element is exceeded. Thrust exerted by the ground coffee may cause the closure element to bend.

20 Claims, 3 Drawing Sheets

(56) References Cited

U.S. PATENT DOCUMENTS

| | | | | |
|---|---|---|---|---|
| 2014/0030418 | A1* | 1/2014 | Reust | A47J 31/407 |
| | | | | 99/289 R |
| 2014/0110019 | A1* | 4/2014 | Keefe | A47J 43/28 |
| | | | | 141/345 |
| 2015/0157166 | A1* | 6/2015 | Van Os | A47J 31/42 |
| | | | | 99/280 |
| 2016/0174751 | A1* | 6/2016 | Fusco | B65B 1/363 |
| | | | | 99/323.3 |
| 2017/0112325 | A1* | 4/2017 | Ioannone | A47J 42/50 |
| 2018/0153332 | A1* | 6/2018 | Abbiati | A47J 42/40 |
| 2018/0153349 | A1* | 6/2018 | Abbiati | A47J 31/404 |
| 2019/0082892 | A1* | 3/2019 | Giorgella | A47J 42/40 |
| 2019/0357720 | A1* | 11/2019 | Abbiati | A47J 42/38 |
| 2020/0015629 | A1* | 1/2020 | Mazzer | A47J 42/40 |

* cited by examiner

GRINDER-DOSERS

CROSS-REFERENCE TO RELATED APPLICATION(S)

This application claims priority under 35 U.S.C. § 119 from Italian Patent Application No. 102019000023256, filed on Dec. 6, 2019, in the Italian Patent and Trademark Office ("IPTO"), the entire contents of which are incorporated herein by reference.

FIELD OF THE INVENTION

The present invention relates to a grinder-doser, in particular for roasted coffee beans for use in preparing a beverage, whose characteristic is to dispense the ground product with different particle sizes according to the type of selected beverage.

Background Art

Roasted coffee bean grinder-doser devices are known to comprise a grinding chamber, a pair of grinders, one on top of the other, housed within said grinding chamber and positioned with a horizontal or vertical orientation. One grinder of the pair of grinders, is rotatable relative to the other grinder, which is kept stationary and is mounted to a support, conventionally a drive shaft which is connected to and rotated by an electric drive motor.

The grinding chamber, containing the grinders, has a first conduit for introducing the roasted coffee beans to be ground between the grinders and a second conduit for discharging the grounds.

In addition, the device also comprises a conventional electronic control unit which supervises the various functions of the device.

When the grinding device is operated, automatically or by an operator's command, the relative motion of the grinders creates a negative pressure which causes and facilitates the entry of the beans into the grinding chamber and transfers them into the area in which the grinders are operative. Depending on the type of beverage to be dispensed, such as espresso coffee or American coffee, the grounds must have different particle sizes, whereby the grinders are spaced apart to varying extents according to the type of grounds to be obtained. Furthermore, the amount of grounds required to prepare American coffee is greater than the one needed to dispense espresso, so the operator sets the proper grinding time, i.e. the time during which the grinders are rotated.

Prior art grinder-dosers may operate in two different modes.

In a first mode of operation, conventionally known as the classical mode of operation, the grinder-doser delivers a dose of coffee defined by the grinding time, i.e. by the time during which the grinders are rotated relative to each other. This grinding time is selected by the operator as he/she programs the grinder-doser. In this mode, the grinding time defines the dose of ground coffee that will be dispensed.

On the other hand, in a second mode of operation, conventionally known as single-shot mode of operation, a specific dose of coffee beans is manually introduced into the grinder-doser and is later ground and dispensed into the collection means located immediately below the dispensing conduit. The operator operates the grinder-doser after introducing the dose of coffee beans into the grinding chamber and only stops the grinding operation when he/she no longer sees the ground coffee coming out. This second mode of operation is generally used in bars that afford a high degree of beverage customization, i.e. where the bartender selects the type of coffee preferred by the customer, the dose required to obtain an optimal brew and finally sets the proper particle size.

A compacting member is also known to be used in grinder-dosers of the prior art. This compacting member has a dual purpose, i.e. reducing the electrostatic charge of the ground coffee, and especially providing a uniform and constant outflow of ground coffee.

Nevertheless, the compacting member prevents the grinding chamber and all the conduits downstream therefrom from being completely emptied. This problem is most felt in single-shot operating grinder-dosers, which must dispense all the coffee dose that has been manually introduced by the operator. However, classically operating grinder-dosers can obviate this problem by increasing the grinding time to ensure that the desired dose will be dispensed.

Therefore, single-shot operating grinder-dosers require removal of any coffee partially left in the grinding chamber and in the conduit downstream from the grinding chamber. For this purpose, this conduit is equipped with a beating element, typically a hammer with a return spring, which is actuated by the operator to vigorously shake the end wall of the conduit. Nevertheless, only a partial cleaning effect is thus obtained. Thus, in single-shot operating grinder-dosers the compacting member may be eliminated to provide an unobstructed flow of ground coffee.

Furthermore, it frequently happens that one grinder-doser is required, irrespective of its mode of operation, to dispense ground coffee intended for the preparation of different types of coffee, such as espresso or American coffee. Thus, in addition to varying the particle size, which is obtained by spreading apart the grinders, specific compacting members should be used. This is the only way to ensure proper uniformity and the right flow of the ground coffee flow for preparing a particular type of coffee. Here, two different grinders must be used, resulting in cost increase and a considerable reduction of the working area.

OBJECT OF THE INVENTION

One object of the invention is to be able to dispense types of coffee, differing in terms of particle size and dose, using the same grinder-doser.

One more object is to be able to dispense ground coffee in both classical and single-shot operating modes using the same grinder-doser.

These and other objects, as better explained hereafter, are fulfilled by a grinder-doser characterized by claim 1 hereinafter.

BRIEF DESCRIPTION OF THE DRAWINGS

The invention will be now described in greater detail with reference to a practical implementation example, which is given by way of illustration and without limitation in the accompanying drawings, in which.

DETAILED DESCRIPTION

Figure 1:
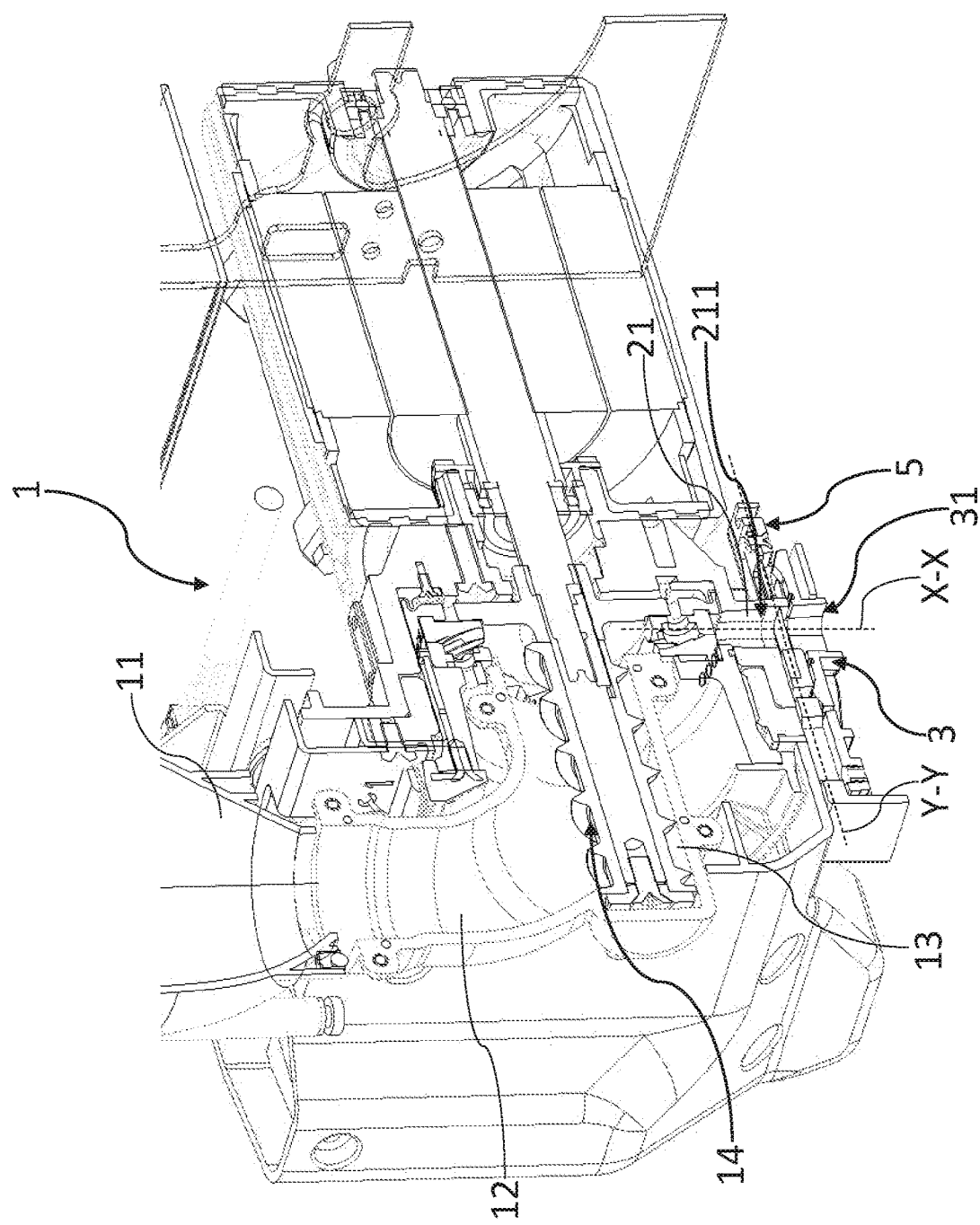
FIG. 1 shows a sectional perspective view of a grinder-doser of the present invention.
Figure 2:
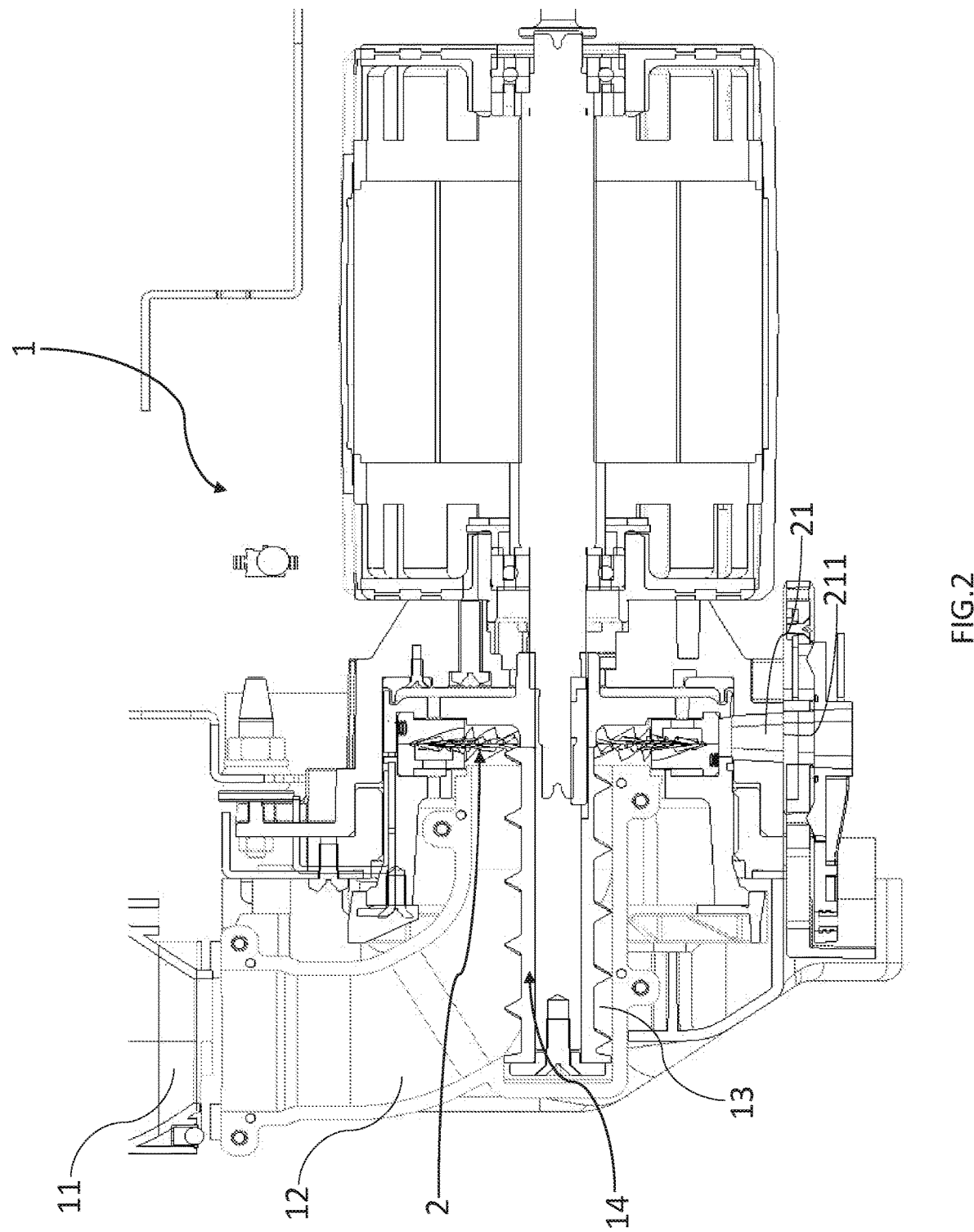
FIG. 2 shows a sectional side view of the grinder-doser of FIG. 1.
Figure 3:
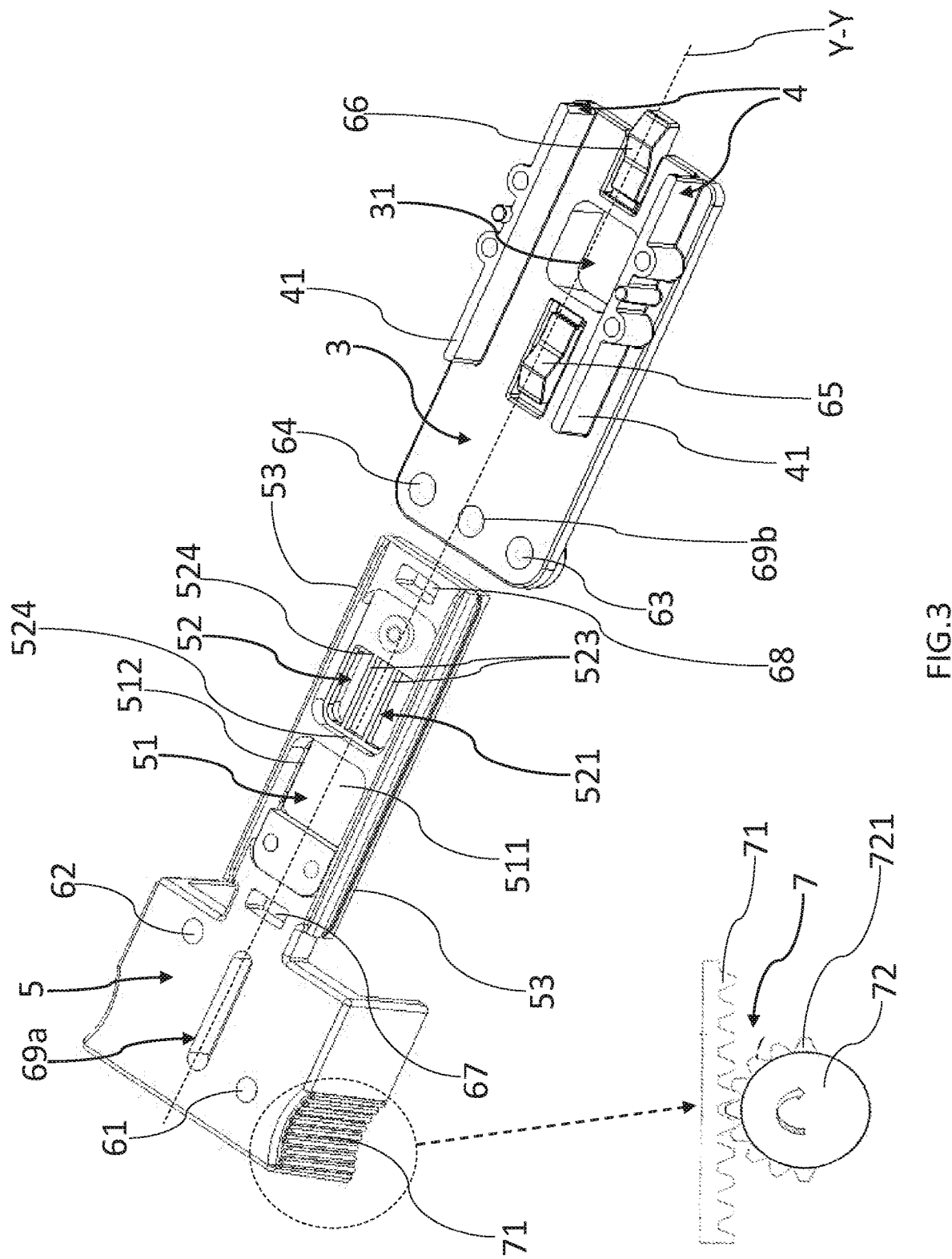
FIG. 3 shows a perspective view of a detail of the grinder-doser of FIG. 1.

Referring to the accompanying figures, numeral 1 generally designates a grinder-doser of the present invention.

This grinder-doser 1 comprises grinding members 2, configured to receive and grind coffee beans and deliver ground coffee into a dispensing conduit 21. Preferably, the grinder-doser 1 comprises a hopper 11 configured to contain the coffee beans, a first channeling conduit 12 and a second channeling conduit 13 arranged transverse to the first channeling conduit 12. The first channeling conduit 12 is interposed between the hopper 11 and the second channeling conduit 13 and is configured to guide the coffee beans by gravity from the hopper 11 to the second channeling conduit 13.

Preferably, the grinder-doser 1 comprises an auger 14 arranged in the second channeling conduit 13 and configured to channel the coffee beans into the grinding members 2. These grinding members 2 are interposed between the second channeling conduit 13 and the dispensing conduit 21.

Then, the ground coffee moves by gravity from the grinding members 2 out of an end opening 211 of the dispensing conduit 21.

The grinder-doser 1 further comprises a compacting member 3 comprising a dispensing opening 31 aligned with the dispensing conduit 21 for receiving the ground coffee from the dispensing conduit 21. In other words, this dispensing opening 31 is transversely arranged along a main axis of extension X-X of the dispensing conduit 21 and is aligned with the end opening 211 of such dispensing conduit 21.

The grinder-doser 1 comprises a slide guide 4. This slide guide 4 is arranged along a sliding direction Y-Y transverse to the main direction of extension X-X of the dispensing conduit 21. Preferably, such slide guide 4 is associated with the compacting member 3. More preferably, the slide guide 4 and the compacting member 3 are formed of one piece.

In addition, the grinder-doser 1 comprises a sliding block 5 comprising a first opening 51 and a second opening 52. The sliding block 5 can slide along the slide guide 4 to selectively superimpose the first 51 and the second 52 openings on the dispensing opening 31, thereby allowing the ground coffee to move from the dispensing conduit 21 to the dispensing opening 31 via the first opening 51 or the second opening 52. In other words, the sliding block 5 can slide in the sliding direction Y-Y to selectively align the first opening 51 or the second opening 52 with the end opening 211 of the dispensing conduit 21. Advantageously, by sliding the sliding block 5 the ground coffee may be caused to flow out of the first opening 51 or the second opening 52.

The first opening 51 is reversibly closed by a closure element 511. Preferably, the closure element 511 is made of a metal material. Alternative, the closure element 511 is made of a plastic material. Still preferably, the closure element 511 is flexible.

The closure element 511 comprises a flexible sheet fixed to an edge 512 of the first opening 51. More preferably, the closure element 511 consists of the sheet fixed to the edge 512 of the first opening 51.

Still preferably, the sheet has a thickness of a few tenths of a millimeter. Preferably, the thickness of the sheet ranges from 0.01 mm to 0.1 mm. More preferably, the thickness of the sheet ranges from 0.03 mm to 0.08 mm.

This closure element 511 allows the ground coffee to move from the dispensing conduit 21 to the dispensing opening 31 when a limit value of the thrust exerted by the ground coffee on the closure element 511 is exceeded. The thrust exerted by the ground coffee causes the closure element 511 to bend. This thrust exerted by the ground coffee on the closure element 511 corresponds to a pressing action, whereas the limit value of the thrust exerted corresponds to the thrust/pressure value that equals the bending strength of the closure element 511. This thrust of the ground coffee on the closure element 511 is given by the mass of the ground coffee and the centrifugal force applied by the grinding members 2 to such mass of ground coffee. In other words, as long as the thrust exerted by the ground coffee is less than the bending strength of the closure element 511, the closure element 511 does not allow the ground coffee to flow out of the dispensing opening 31. Therefore, the closure element 511 obstructs passage of ground coffee, thereby forcing the ground coffee to stay in the grinding members 2 for a long time. In other words, as long as the thrust exerted by the ground coffee on the closure element 511 is lower than the bending strength of the closure element 511, the ground coffee stays between the grinding members 2. Such prolonged stay of the ground coffee in the grinding members 2 results in uniform grinding. Conversely, as the limit value for the thrust exerted by the ground coffee on the closure element 511 is exceeded, the closure element 511 begins to bend, thereby allowing the ground coffee to progressively flow out of dispensing opening 31.

It shall be noted that the first opening 51 may be used, for example, to dispense a dose of coffee in a conventional mode of operation, i.e. with the dose of ground coffee being given by the grinding time of the grinding members 2. Furthermore, since the closure element 511 affords more uniform grinding of the coffee beans and more uniform outflow of ground coffee from the dispensing opening 31, once the grinding time has been set, the dose of ground coffee obtained from the dispensing opening 31 is more regular, and variations from the theoretical dose selected by setting the grinding time is reduced. Advantageously, the first opening 51 can be used to dispense a dose of ground coffee intended for preparing, for example, espresso, for which the variability of the dose of ground coffee in use has a significant effect on the quality of the final product.

It shall be also noted that, by aligning the second opening 52 with the dispensing opening 31, a single-shot dose of ground coffee may be dispensed, i.e. with the amount of ground coffee given by the amount of beans introduced into the hopper 11. On the other hand, the second opening 52 can be used to dispense ground coffee having a larger particle size than the one that can be dispensed via the first opening 51. This larger-particle size ground coffee is suitable, for example, to prepare American coffee.

Finally, it should be noted that the compacting member 3 affords a uniform outflow of ground coffee from the dispensing opening 31 in both classical and single-shot modes, and irrespective of the particle size of the ground coffee obtained.

According to one embodiment, not shown in the accompanying figures, the sliding block 5 comprises a plurality of openings and is able to slide along the slide guide 4 to selectively align one of the plurality of openings with the dispensing opening 31 of the compacting member 3.

According to a preferred embodiment of the invention, the sliding block 5 comprises intercepting members 521 arranged in the second opening 52, and configured to intercept the ground coffee moving from the dispensing conduit 21 to the dispensing opening 31. Preferably, these intercepting members 521 are made of a metal material, which can reduce the electrostatic charge in the ground coffee that passes through the second opening 52, and to avoid the accumulation of ground coffee in the compacting member 3. Preferably, these intercepting members 521 comprise a plurality of cross-members 523 interposed between a pair of opposite edges 524 of the second opening 52. More preferably, these intercepting members 521 define a grille (not shown). This grille is arranged between the pair of opposite edges 524 of the second opening 52.

According to the preferred embodiment of the invention, the sliding block 5 is interposed between the dispensing conduit 21 and the compacting member 3. In other words, the sliding block 5 is configured to slide along the slide guide 4, hence in the sliding direction Y-Y, and always being interposed between the dispensing conduit 21 and the compacting member 3.

According to the preferred embodiment of the invention, the slide guide 4 comprises a pair of rails 41. The sliding block 5 is configured to slide along the pair of rails 41. In other words, the sliding block 5 comprises a pair of sliders 53. Each slider 53 is configured to slide along a respective rail 41 of the slide guide 4.

According to the preferred embodiment of the invention, the grinder-doser 1 comprises lock means for reversibly locking the sliding block 5 over the compacting member 3 such that the first opening 51 and the second opening 52 will be selectively superimposed to the dispensing opening 31. For example, as a result of the sliding movement of the sliding block 5 along the slide guide 4 to align the first opening 51 with the end opening 211 of the dispensing conduit 21, the lock means can reversibly lock the sliding movement of the sliding block 5 for the first opening 51 to remain in line with the end opening 211 of the dispensing conduit 21, thereby allowing the ground coffee to move from the dispensing conduit 21 to the delivery opening 31 via the first opening 21. By releasing the lock means, the sliding block 5 can slide again along the slide guide 4 to align, for example, the second opening 52 with the end opening 211 of the dispensing conduit 21.

According to a first embodiment of the invention, the lock means comprises a first hole 61 and a second hole 62 formed in the sliding block 5, a third hole 63 and a fourth hole 64 formed in the compacting member and a locking screw (not shown). The first hole 61 and the third hole 63 can be aligned and locked in their aligned position by the locking screw to superimpose the first opening 51 on the dispensing opening 31. In other words, the alignment of the first hole 61 and of the third hole 63 by the sliding movement of the sliding block 5 along the slide guide 4 causes the first opening 51 to be superimposed on the dispensing opening 31 and therefore the first opening 51 to be aligned with the end opening 211 of the dispensing conduit 21. In the alternative, the second hole 62 and the fourth hole 64 can be aligned and locked in their aligned position by the locking screw to superimpose the second opening 52 on the dispensing opening 31. In other words, the alignment of the second hole 62 and the fourth hole 64 by sliding the sliding block 5 along the slide guide 4 causes the second opening 52 to be superimposed on the dispensing opening 31 and hence the second opening 52 to be aligned with the end opening 211 of the dispensing conduit 21.

According to a second embodiment that can be provided instead of or in combination with the first embodiment of the invention, the lock means comprise a first projection 65 and a second projection 66 and a first slit 67 and a second slit 68. Preferably, the first projection 65 and the second projection 66 are formed on the compacting member 3, whereas the first slit 67 and the second slit 68 are formed on the sliding block 5. Still preferably, the first 65 and second 66 projections are formed with a tab shape.

The first projection 65 is adapted to be aligned and locked within the first slit 67 to superimpose the first opening 51 on the dispensing opening 31. As the first projection 65 is introduced into the first slit 67, the first opening 51 is brought to alignment with the end opening 211 of the dispensing conduit 21. In the alternative, the second projection 66 can be aligned and locked within the second slit 68 to superimpose the second opening 52 on the dispensing opening 31. As the second projection 66 is introduced into the second slit 68, the second opening 52 is brought to alignment with the end opening 211 of the dispensing conduit 21.

In the embodiment in which the sliding block 5 comprises a plurality of openings, the lock means comprise a slot 69a formed on the sliding block 5 and extending in the sliding direction Y-Y, a fifth hole 69b formed on the compacting member 3 and an additional locking screw. An opening of the plurality of openings of the sliding block 5 is locked in its superimposing position on the dispensing opening 31 of the compacting member 3 by introducing and locking the additional locking screw into the slit 69a and the fifth hole 69b.

According to a preferred embodiment of the invention, the grinder-doser 1 comprises drive means 7 which are configured to be actuated to allow the sliding block 5 to slide along the slide guide 4. In other words, the drive means 7 allow the sliding block 5 to slide in the sliding direction Y-Y.

Preferably, the drive means 7 comprises a rack 71 associated with the sliding block 5 and a driving shaft 72. The driving shaft 72 has an outer toothed surface 721 which is configured to mesh with the rack 71. The rotation of the driving shaft 72 in contact with the rack 71 allows the sliding block 5 to slide along the slide guide 4. As a result of the rotation of the driving shaft 72, the mesh between the outer toothed surface 721 and the rack 71 causes the sliding block 5 to slide along the slide guide 4 and hence in the sliding direction Y-Y. For example, a clockwise rotation of the driving shaft 72 causes the sliding block 5 to slide in the sliding direction Y-Y toward the dispensing conduit 21, and conversely an anti-clockwise rotation of the driving shaft 72 causes the sliding block 5 to slide away from the dispensing conduit 21.

According to the preferred embodiment of the invention, the grinder-doser 1 comprises a control unit configured to control the grinding members 2 and the drive means 7. Therefore, the control unit is configured to control the grinding degree of the grinding members 2 (e.g., the particle size of the ground coffee) and to set the grinding time. Also, the control unit can actuate the drive means 7 and can cause the sliding block 5 to slide along the slide guide 4 in order to selectively superimpose the first opening 51 or the second opening 52 on the dispensing opening 31.

Instead of being driven by drive means 7, the sliding block 5 also may be manually caused to slide along the slide guide 4 by an operator. If the sliding block 5 is manually slid by an operator, the sliding block 5 has a knurled grip portion (not shown in the accompanying drawings) which facilitates manual movement of the sliding block 5.

The invention claimed is:

1. A grinder-doser, comprising:
    grinding members configured to receive and grind coffee beans and configured to deliver ground coffee into a dispensing conduit;
    a compacting member comprising a dispensing opening aligned with the dispensing conduit for receiving the ground coffee from the dispensing conduit;
    a slide guide; and
    a sliding block comprising first and second openings and configured to slide along the slide guide for selectively superimposing the first opening or the second opening to the dispensing opening, allowing the ground coffee to move from the dispensing conduit to the dispensing opening via the first opening or the second opening;

wherein the first opening is reversibly closed by a closure element, wherein the closure element comprises a flexible sheet fixed to one edge of the first opening, wherein the closure element is configured to allow the ground coffee to move from the dispensing conduit to the dispensing opening as a thrust limit value exerted by the ground coffee on the closure element is exceeded, wherein thrust exerted by the ground coffee causes the closure element to bend, and wherein the second opening is configured to allow larger particle sizes of the ground coffee to pass through the second opening than particle sizes of the ground coffee allowed to pass through the first opening.

2. The grinder-doser of claim 1, wherein the sliding block comprises intercepting members in the second opening that are configured to intercept the ground coffee moving from the dispensing conduit to the dispensing opening.

3. The grinder-doser of claim 2, wherein the intercepting members define a grille.

4. The grinder-doser of claim 2, wherein the intercepting members comprise metal material.

5. The grinder-doser of claim 2, wherein the intercepting members are configured to reduce electrostatic charge in the ground coffee that passes through the second opening.

6. The grinder-doser of claim 1, wherein the sliding block is interposed between the dispensing conduit and the compacting member.

7. The grinder-doser of claim 1, wherein the slide guide comprises a pair of rails, and wherein the sliding block is configured to slide along the rails.

8. The grinder-doser of claim 1, further comprising:

lock means for reversibly locking the sliding block over the compacting member such that the first opening or the second opening will be selectively superimposed to the dispensing opening.

9. The grinder-doser of claim 8, wherein the lock means comprises a first hole and a second hole formed on the sliding block, a third hole and a fourth hole formed on the compacting member, and a locking screw, wherein the first hole and the third hole are configured to be locked in aligned relationship using the locking screw to superimpose the first opening to the dispensing opening, and wherein the second hole and the fourth hole are configured to be locked in aligned relationship using the locking screw to superimpose the second opening to the dispensing opening.

10. The grinder-doser of claim 8, wherein the lock means comprises a first projection, a second projection, a first slit, and a second slit, wherein the first projection is configured to be locked in the first slit for superimposing the first opening to the dispensing opening, and wherein the second projection is configured to be locked in the second slit for superimposing the second opening to the dispensing opening.

11. The grinder-doser of claim 1, comprising drive means configured to drive the sliding block along the slide guide.

12. The grinder-doser of claim 11, wherein the drive means comprises a rack associated with the sliding block and a drive shaft, and wherein rotation of the drive shaft in contact with the rack drives the sliding block along the slide guide.

13. The grinder-doser of claim 1, wherein the closure element comprises metal material.

14. The grinder-doser of claim 1, wherein the closure element comprises plastic material.

15. The grinder-doser of claim 1, wherein a thickness of the flexible sheet is greater than or equal to 0.01 millimeters (mm) and less than or equal to 0.1 mm.

16. The grinder-doser of claim 15, wherein the thickness of the flexible sheet is greater than or equal to 0.03 mm.

17. The grinder-doser of claim 15, wherein the thickness of the flexible sheet is less than or equal to 0.08 mm.

18. The grinder-doser of claim 1, wherein a thickness of the flexible sheet is greater than or equal to 0.03 millimeters (mm) and less than or equal to 0.08 mm.

19. The grinder-doser of claim 1, wherein the first opening is configured to allow a dispensed amount of the ground coffee to be determined by a grinding time of the grinding members.

20. The grinder-doser of claim 1, wherein the second opening is configured to allow a dispensed amount of the ground coffee to be determined by an amount of the coffee beans introduced to the grinder-doser.

* * * * *